United States Patent
Chen

(10) Patent No.: US 6,598,848 B2
(45) Date of Patent: Jul. 29, 2003

(54) MOLDING DEVICE

(76) Inventor: Shou-Shan Chen, 58, Ma Yuan West St., Taichung (TW)

( * ) Notice: Subject to any disclaimer, the term of this patent is extended or adjusted under 35 U.S.C. 154(b) by 136 days.

(21) Appl. No.: 09/975,605

(22) Filed: Oct. 9, 2001

(65) Prior Publication Data

US 2003/0068395 A1 Apr. 10, 2003

(51) Int. Cl.7 .............................................. B29C 39/26
(52) U.S. Cl. ..................... 249/134; 249/144; 249/151; 249/165; 249/167
(58) Field of Search ................................ 249/117, 134, 249/144, 151, 160, 165, 167

(56) References Cited

U.S. PATENT DOCUMENTS

| | | | | |
|---|---|---|---|---|
| 39,189 A | * | 7/1863 | Williamson | 249/105 |
| 153,923 A | * | 8/1874 | Andrews | 249/186 |
| 3,279,740 A | * | 10/1966 | Long | 249/181 |
| 5,843,325 A | * | 12/1998 | Sou-San | 249/103 |

* cited by examiner

*Primary Examiner*—James P. Mackey
*Assistant Examiner*—Donald Heckenberg

(57) ABSTRACT

A molding device has a first outer mold, a second outer mold engaging with the first outer mold, a silicon mold disposed between the first outer mold and the second outer mold, a center mold, an upper ring, and a lower seat. The first outer mold has a first inner thread, a first upper flange, a first upper inner groove, a first middle flange, a first lower flange, a first bottom base, and a first lower inner groove. The second outer mold has a second inner thread, a second upper flange, a second upper inner groove, a second middle flange, a second lower flange, a second bottom base, and a second lower inner groove. The lower seat is inserted in the first lower inner groove of the first outer mold and the second lower inner groove of the second outer mold. The center mold passes through the upper ring and the silicon mold.

3 Claims, 5 Drawing Sheets

MOLDING DEVICE

BACKGROUND OF THE INVENTION

The present invention relates to a molding device. More particularly, the present invention relates to a molding device which has a first outer mold and a second outer mold.

A conventional molding device has an outer cylinder mold, a silicon mold inserted in the outer cylinder mold, and a center mold inserted in the silicon mold. However, the outer cylinder mold is easily released from the silicon mold.

SUMMARY OF THE INVENTION

An object of the present invention is to provide a molding device which has a first outer mold and a second outer mold to enclose a silicon mold stably.

Accordingly, a molding device comprises a first outer mold, a second outer mold, a silicon mold, a center mold, an upper ring, a lower seat, a retainer device, and an upper clamp device. The first outer mold has a first inner thread, a first upper flange, a first upper inner groove, a first middle flange, a first lower flange, a first bottom base, and a first lower inner groove. The second outer mold has a second inner thread, a second upper flange, a second upper inner groove, a second middle flange, a second lower flange, a second bottom base, and a seconds lower inner groove. The upper ring has a bottom flange and an upper inner flange. The lower seat has an upper step flange and an inner bottom recess. The center mold has a disk head and a bottom protrusion matching the inner bottom recess of the lower seat. The first outer mold engages with the second outer mold. The lower seat is inserted in the first lower inner groove of the first outer mold and the second lower inner groove of the second outer mold. The silicon mold is disposed between the first outer mold and the second outer mold. The upper ring is inserted in the first upper inner groove of the first outer mold and the second upper inner groove of the second outer mold. The center mold passes through the upper ring and the silicon mold and the bottom protrusion is inserted in the inner bottom recess of the lower seat. The disk head of the center mold has an outer thread engaging with the first inner thread of the first outer mold and the second inner thread of the second outer mold. The silicon mold is disposed on the upper step flange of the lower seat. The silicon mold encloses the bottom flange of the upper ring. The retainer device fastens the first middle flange of the first outer mold and the second middle flange of the second outer mold. The upper clamp device encloses the disk head of the center mold, the first upper flange of the first outer mold and the second upper flange of the second outer mold.

DETAILED DESCRIPTION OF THE INVENTION

Figure 1:
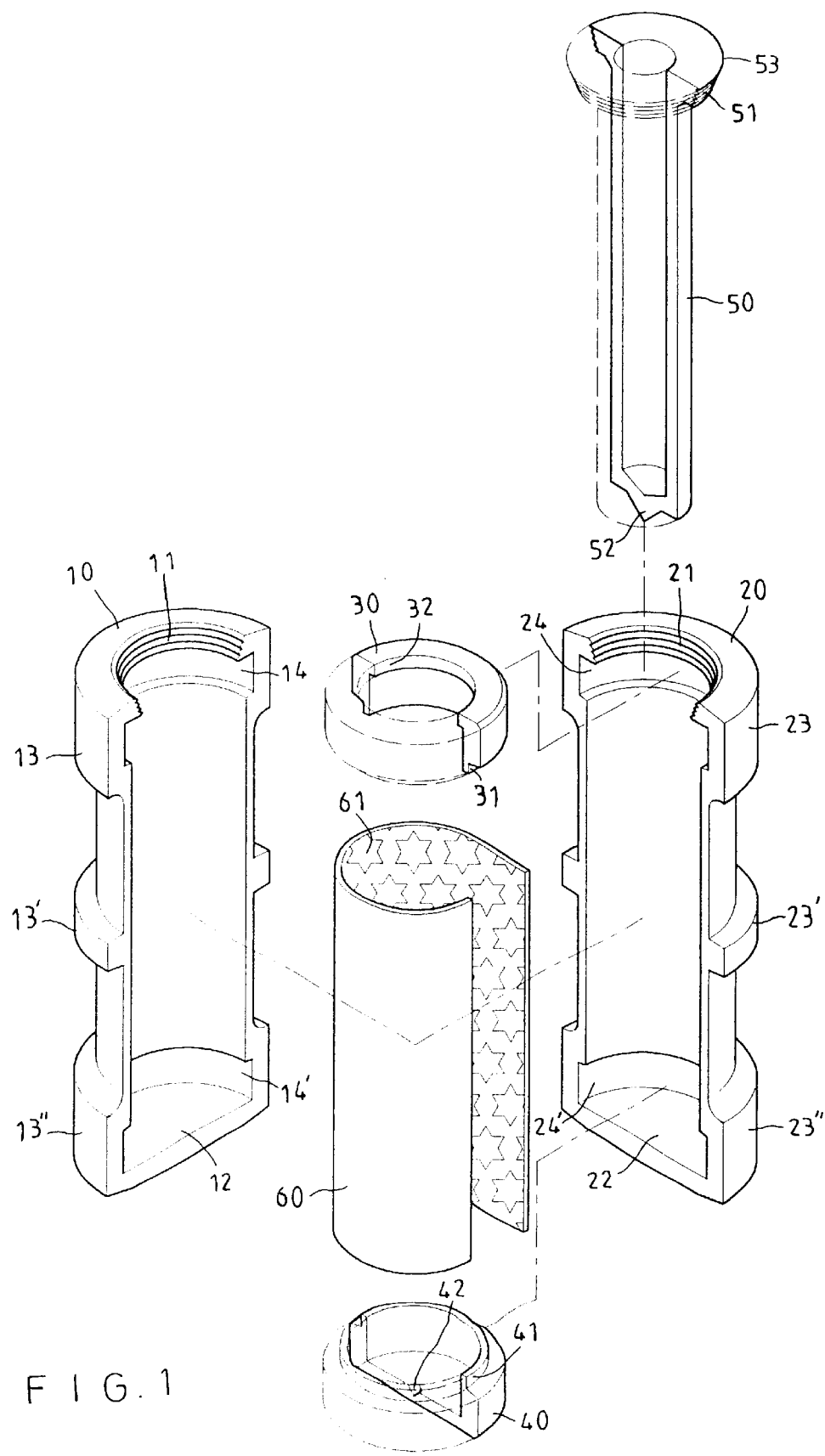
FIG. 1 is a perspective exploded view of a molding device of a preferred embodiment in accordance with the present invention.
Figure 2:
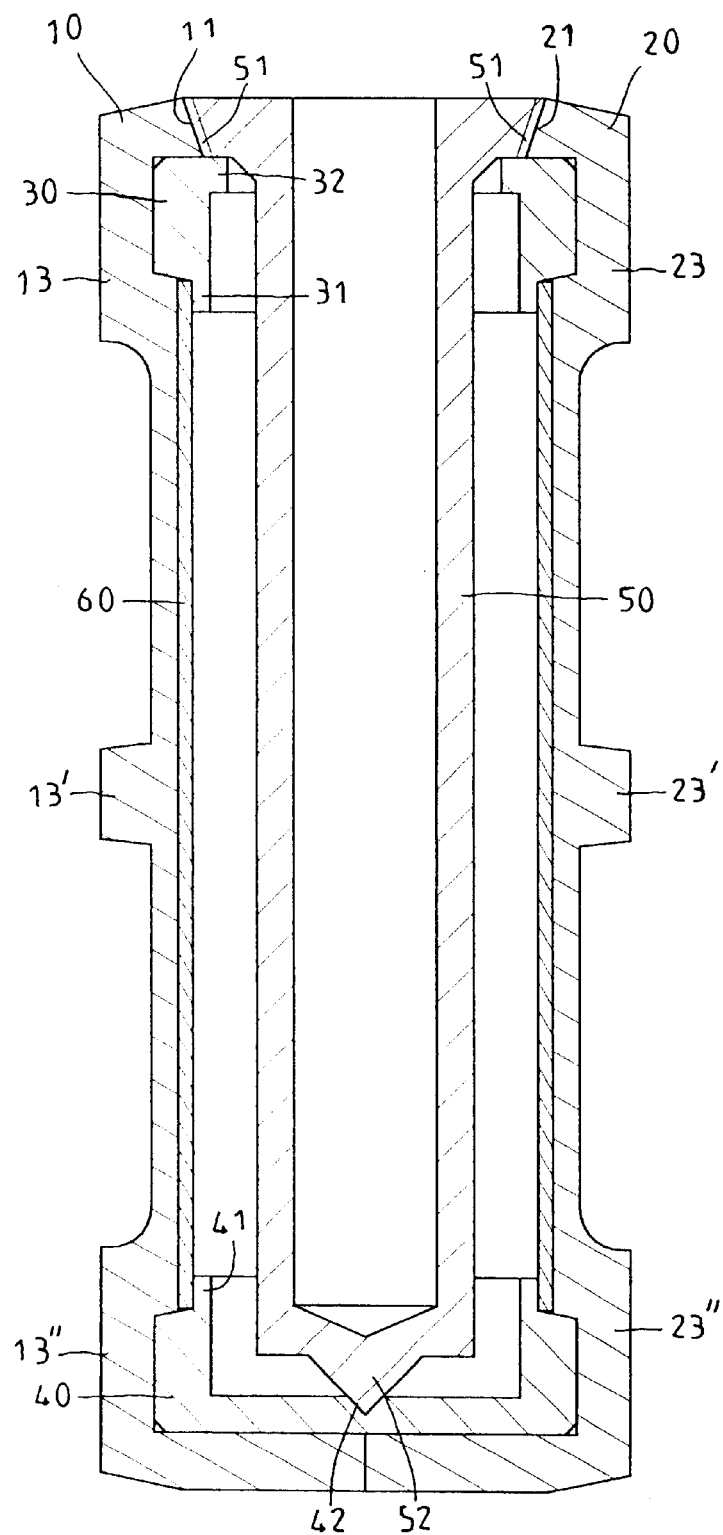
FIG. 2 is a sectional assembly view of a molding device of a preferred embodiment in accordance with the present invention.
Figure 3:
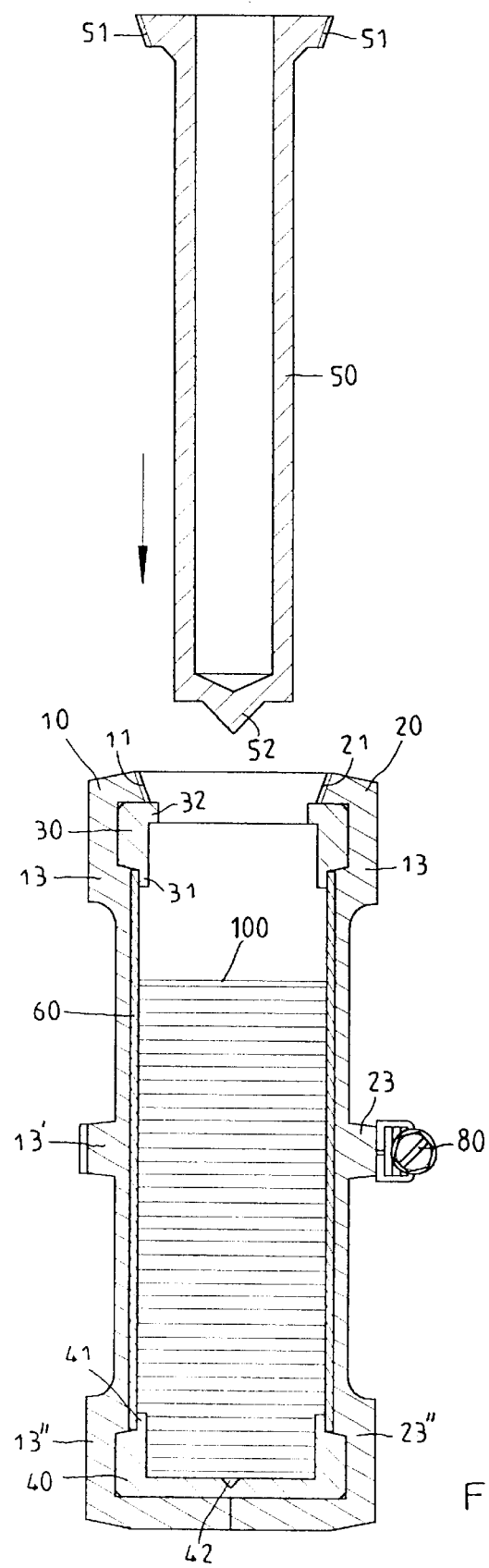
FIG. 3 is a schematic view illustrating a colorful liquid plastics material is poured in a silicon mold before a center mold is inserted in the silicon mold.
Figure 4:
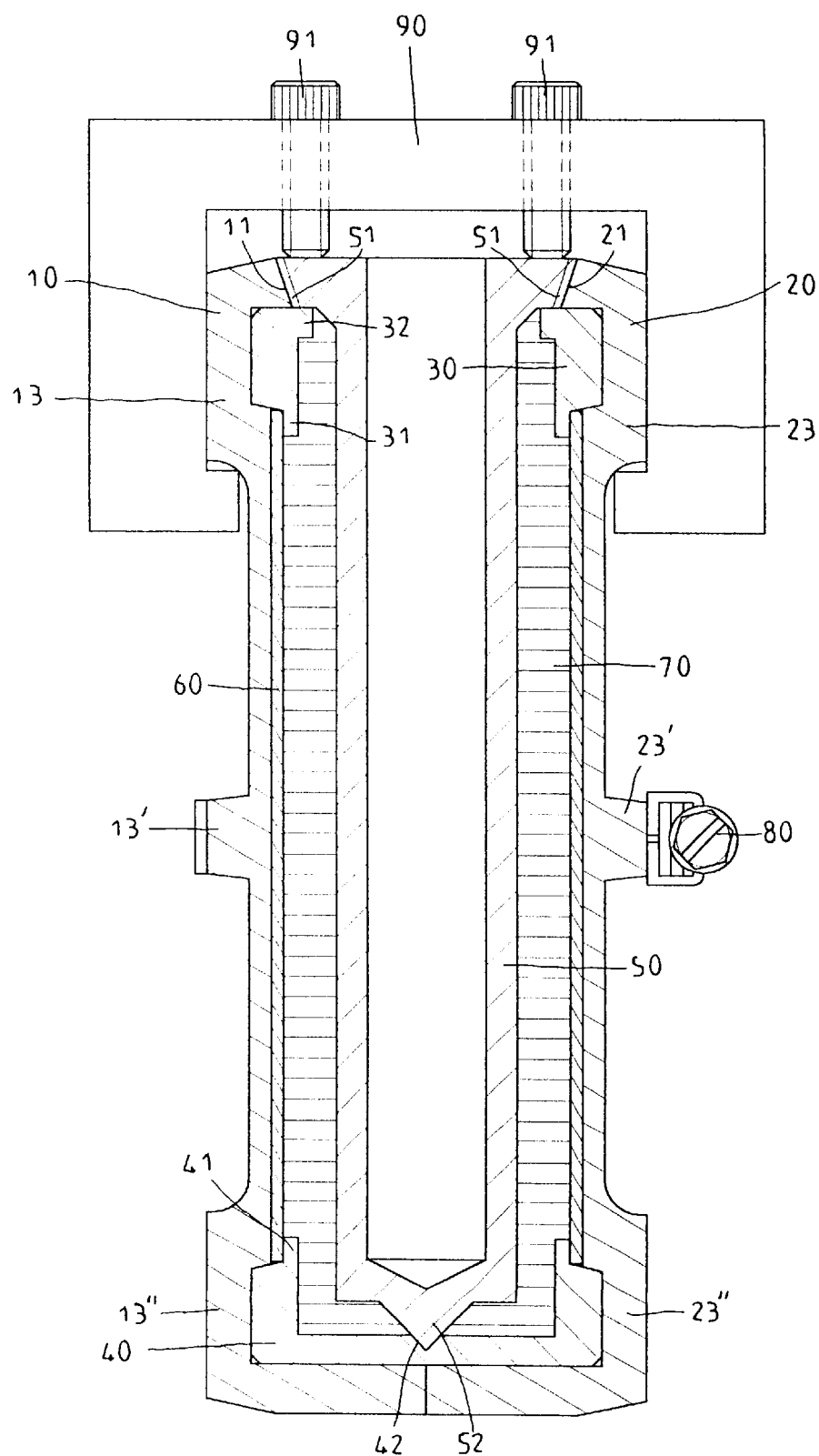
FIG. 4 is a schematic view illustrating a first outer mold and a second outer mold are fastened by a retainer device and an upper clamp device.

Referring to FIGS. 1 to 4, a molding device comprises a first outer mold 10, a second outer mold 20, a silicon mold 60, a center mold 50, an upper ring 30, a lower seat 40, a retainer device 80, and an upper clamp device 90.

The first outer mold 10 has a first inner slant thread 11, a first upper flange 13, a first upper inner groove 14, a first middle flange 13', a first lower flange 13", a first bottom base 12, and a first lower inner groove 14'.

The second outer mold 20 has a second inner slant thread 21, a second upper flange 23, a second upper inner groove 24, a second middle flange 23', a second lower flange 23", a second bottom base 22, and a second lower inner groove 24'.

The silicon mold 60 has a plurality of inner patterns 61.

The disk head 53 has an outer slant thread 51.

The upper ring 30 has a bottom flange 31 and an upper inner flange 32.

The lower seat 40 has an upper step flange 41 and an inner bottom recess 42.

The center mold 50 has a disk head 53 and a bottom protrusion 52 matching the inner bottom recess 42 of the lower seat 40.

The first outer mold 10 engages with the second outer mold 20.

The lower seat 40 is inserted in the first lower inner groove 14' of the first outer mold 10 and the second lower inner groove 24' of the second outer mold 20.

The silicon mold 60 is disposed between the first outer mold 10 and the second outer mold 20.

The upper ring 30 is inserted in the first upper inner groove 14 of the first outer mold 10 and the second upper inner groove 24 of the second outer mold 20.

The center mold 50 passes through the upper ring 30 and the silicon mold 60 and the bottom protrusion 52 is inserted in the inner bottom recess 42 of the lower seat 40.

The disk head 53 of the center mold 50 has an outer slant thread 51 engaging with the first inner slant thread 11 of the first outer mold 10 and the second inner slant thread 21 of the second outer mold 20.

The silicon mold 60 is disposed on the upper step flange 41 of the lower seat 40.

The silicon mold 60 encloses the bottom flange 31 of the upper ring 30.

The retainer device 80 fastens the first middle flange 13' of the first outer mold 10 and the second middle flange 23' of the second outer mold 20.

The upper clamp device 90 encloses the disk head 53 of the center mold 50, the first upper flange 13 of the first outer mold 10 and the second upper flange 23 of the second outer mold 20.

Two bolts 91 fasten the upper clamp device 90 and the disk head 53 of the center mold 50 together.

Referring to FIG. 3 again, a colorful liquid plastics material 100 is poured in the silicon mold 60 before the center mold 50 is inserted in the silicon mold 60.

Figure 5:
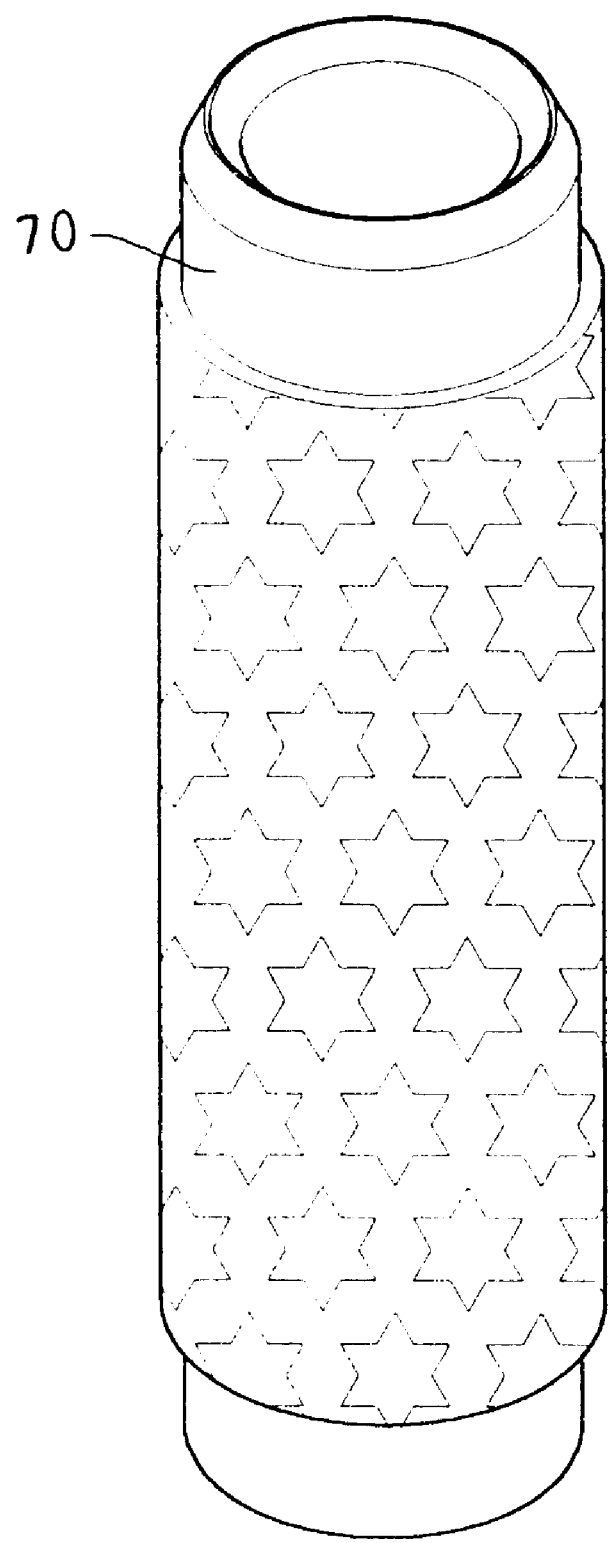
FIG. 5 is a perspective view of a colorful plastics product.

Referring to FIG. 5, a colorful plastics product 70 is formed by the molding device after the molding device and the colorful liquid plastics material 100 are placed in an oven (not shown in the figures) in order to dry the colorful liquid plastics material 100.

The invention is not limited to the above embodiment but various modification thereof may be made. Further, various changes in form and detail may be made without departing from the scope of the invention.

I claim:

1. A molding device comprises:

a first outer mold, a second outer mold, a silicon mold, a center mold, an upper ring, a lower seat, a retainer device, and an upper clamp device, the first outer mold having a first inner thread, a first upper flange, a first upper inner groove, a first middle flange, a first lower flange, a first bottom base, and a first lower inner groove, the second outer mold having a second inner thread, a second upper flange, a second upper inner groove, a second middle flange, a second lower flange, a second bottom base, and a second lower inner groove, the upper ring having a bottom flange and an upper inner flange, the lower seat having an upper step flange and an inner bottom recess, the center mold having a disk head and a bottom protrusion matching the inner bottom recess of the lower seat, the first outer mold engaging with the second outer mold, the lower seat inserted in the first lower inner groove of the first outer mold and the second lower inner groove of the second outer mold, the silicon mold disposed between the first outer mold and the second outer mold, the upper ring inserted in the first upper inner groove of the first outer mold and the second upper inner groove of the second outer mold, the center mold passing through the upper ring and the silicon mold, the bottom protrusion of the center mold inserted in the inner bottom recess of the lower seat, the disk head of the center mold having an outer thread engaging with the first inner thread of the first outer mold and the second inner thread of the second outer mold, the silicon mold disposed on the upper step flange of the lower seat, the silicon mold enclosing the bottom flange of the upper ring, the retainer device fastening the first middle flange of the first outer mold and the second middle flange of the second outer mold, and the upper clamp device enclosing the disk head of the center mold, the first upper flange of the first outer mold and the second upper flange of the second outer mold.

2. The molding device as claimed in claim 1, wherein the silicon mold has a plurality of inner patterns.

3. The molding device as claimed in claim 1, wherein two bolts fasten the upper clamp device and the disk head of the center mold together.

* * * * *